United States Patent [19]

Brueckmann et al.

[11] Patent Number: 5,186,846
[45] Date of Patent: Feb. 16, 1993

[54] DYE DISPERSANTS: ARYL SULPHONIC ACID-FORMALDEHYDE CONDENSATE OR LIGNINSULFONATE

[75] Inventors: Ralf Brueckmann, Goennheim; Willi Bury, Ludwigshafen; Johannes P. Dix, Weisenheim; Manfred Herrmann; Waldemar Dlugosch, both of Ludwigshafen; Erich Kromm, Weisenheim; Herbert Letter, Ludwigshafen; Norbert Zimmermann, Waldsee; Wolf-Dieter Kermer, Fussgoenheim; Klaus Taeger, Mannheim, all of Fed. Rep. of Germany

[73] Assignee: BASF Aktiengesellschaft, Ludwigshafen, Fed. Rep. of Germany

[21] Appl. No.: 714,589

[22] Filed: Jun. 13, 1991

[30] Foreign Application Priority Data

Jun. 13, 1990 [DE] Fed. Rep. of Germany ....... 4018873

[51] Int. Cl.$^5$ ................. B01F 17/52; C09B 67/42; C08G 16/02; D06P 1/56
[52] U.S. Cl. .......................... 252/8.7; 8/557; 8/558; 8/58 D; 8/589; 8/594; 252/558
[58] Field of Search .............. 252/8.7; 8/557, 594

[56] References Cited

U.S. PATENT DOCUMENTS

| 3,193,575 | 7/1965 | Nebel et al. | 562/88 |
| 3,954,677 | 5/1976 | Law | 252/355 |
| 4,214,872 | 7/1980 | Uhrig et al. | 8/589 |
| 4,245,996 | 1/1981 | Schade et al. | 8/94.24 |
| 4,247,293 | 1/1981 | Wurmli | 8/94.24 |

FOREIGN PATENT DOCUMENTS

| 3841987 | 6/1990 | Fed. Rep. of Germany . |
| 51-045123 | 4/1976 | Japan . |
| 57-077061 | 5/1982 | Japan . |
| 58-084160 | 5/1983 | Japan . |

OTHER PUBLICATIONS

Japanese Abstract, JP-A-57:077-061, May 14, 1982.
Japanese Abstract, JP-A-58:084-160, May 20, 1983.
Japanese Abstract, JP-A-51:045-123, Apr. 17, 1976.

*Primary Examiner*—A. Lionel Clingman
*Attorney, Agent, or Firm*—Oblon, Spivak, McClelland, Maier & Neustadt

[57] ABSTRACT

Dispersants of increased bioeliminability or biodegradability for use in dye and pigment preparations, as tanning aids, in plastics production and in crop protection formulations contain from 3 to 50% by weight of one or more aromatic or long-chain aliphatic carboxylic acids, salts thereof or anhydrides thereof or a mixture thereof.

6 Claims, No Drawings

DYE DISPERSANTS: ARYL SULPHONIC ACID-FORMALDEHYDE CONDENSATE OR LIGNINSULFONATE

The present invention relates to novel dispersants of increased bioeliminability or biodegradability for use in dye and pigment preparations, as tanning aids, in plastics production and in crop protection formulations.

Dispersants used for industrial purposes, in particular in dye preparations and in dyebaths, are frequently sulfo-containing organic compounds which, however, are only incompletely bioeliminable or biodegradable. For this reason, the use of such agents can pollute surface waters.

DE-C-1 137 005 discloses a process for preparing condensation products of and α- and β-naphthalenesulfonic acids and methylnaphthalenesulfonic acids and the corresponding naphthalenedisulfonic acids with aldehydes. The condensation is carried out at from 100° to 200° C. under superatmospheric pressure. The condensation products thus obtainable are used as tanning assistants, as dispersants for dyes, and in papermaking for preventing resin problems.

JP-A-82-077 061 discloses dispersants for cement which are prepared by condensing formaldehyde with naphthalenesulfonic acid, phenolsulfonic acid and an aromatic carboxylic acid and/or salts thereof.

According to JP-A-83-084 160 a dispersant for cement is obtained by cocondensation of alkylnaphthalenesulfonic acid and an aromatic compound such as naphthalene, anthracene, benzene, toluene, phenol, benzoic acid or sulfonates thereof and humic acid with formaldehyde.

JP-A-76-045 123 discloses the preparation of condensation products of sulfonated aromatic carboxylic acids or of mixtures of sulfonated aromatic carboxylic acids with naphthalene and formaldehyde. The condensation products thus obtainable are added to hydraulic cement mixtures to improve the processing of the latter.

EP-A-0 380 778 discloses the preparation of condensates of arenesulfonic acids and formaldehyde by sulfonation of aryl compounds which are obtainable by thermal cracking of a naphthenic residue oil and fractional distillation of the cracking products of the fraction obtained at from 100° to 120° C. under atmospheric pressure. The sulfonation of this aromatics fraction with oleum at from 120° to 160° C. in an amount of from 0.7 to 1.2 parts by weight of oleum, based on oleum having an SO$_3$ content of 24% by weight, per part by weight of the aromatics fraction and the subsequent condensation of the arenesulfonic acids with formaldehyde are effected in a conventional manner. The condensation products are used as dispersants, in particular as dispersants for preparing dye preparations.

Dye preparations and dyebaths customarily contain dispersants comprising ligninsulfonates, sulfonates of phenol-formaldehyde condensates or naphthalenesulfonic acid/formaldehyde condensates.

Even if properly used, the products mentioned pass into the wastewater in which or from which they are only partly biodegradable or bioeliminable in water treatment plants.

It is an object of the present invention to make available dispersants for various industrial purposes, in particular for dye preparations and dyebaths, which, compared with existing dispersants, are highly eliminable or degradable and at the same time still have good dispersing properties.

We have found that this object is achieved by dispersants of increased bioeliminability or biodegradability for use in dye and pigment products, as tanning aids, in plastics production and in crop protection formulations, which contain from 3 to 50% by weight, preferably from 5 to 30% by weight, of one or more aromatic or long-chain aliphatic carboxylic acids, salts thereof or anhydrides thereof or a mixture thereof.

Dispersants for the purposes of the present invention are in particular sulfo-containing dispersants.

More particularly, the present invention provides dispersants which contain

A) from 50 to 97% by weight, preferably from 70 to 95% by weight, of one or more arenesulfonic acid-formaldehyde condensates, one or more sulfonates of phenol-formaldehyde condensates, one or more lignin-sulfonates or a mixture thereof, and B) from 3 to 50% by weight, preferably from 5 to 30% by weight, of one or more aromatic or long-chain aliphatic carboxylic acids, salts thereof or anhydrides thereof or a mixture thereof, the addition of component B taking place before, during or after the sulfonation step or the condensation step in the preparation of component A.

The term sulfonation step is here also to be understood as meaning the sulfite digestion of lignin to give ligninsulfonates.

Dye preparations are solid or liquid dye formulations and also dyebaths.

The dispersants of the present invention are suitable in particular for use as dispersants for dye formulations and in dyebaths.

Preferred dispersants are those based on condensates of arenesulfonic acids and formaldehyde, obtainable by (a) sulfonating aromatic compounds to arenesulfonic acids and
(b) condensing the arenesulfonic acids with formaldehyde, the sulfonation (a) or the condensation (b) or both steps being effected in the presence of from 5 to 50, preferably 6 to 42, % by weight, based on the aromatic compounds used in the sulfonation (a), of aryl-containing or long-chain alkyl-containing carboxylic acids, or salts or anhydrides thereof.

The preparation of such dispersants according to the present invention is known. Essentially it takes place in two steps. In step (a), aromatic compounds are sulfonated. Suitable aromatic compounds for this purpose are for example naphthalene and mixtures of aromatic compounds which contain at least 10% by weight of naphthalene. Commercial mixtures of aromatics, in addition to naphthalene, contain for example benzene, substituted benzenes, alkylnaphthalenes, such as 1-methylnaphthalene and 2-methylnaphthalene, anthracenes, biphenyl, indene, acenaphthene/substituted indene or substituted acenaphthene.

Preferably, the aromatic compounds used in step (a) for preparing these dispersants are those aromatic compounds which are obtainable by thermal cracking of a naphthenic residue oil and fractionation of the cracking products. Naphthenic residue oils are obtained for example in the cracking of light gasoline. In DE-A-29 47 005 for example they are referred to as high-boiling aromatic hydrocarbon oils. The naphthenic residue oil is preferably thermally cracked at 1400°–1700° C. The cracking products are then subjected to a fractional distillation. The fraction which passes over at atmospheric pressure (1013 mbar) and 100°-120° C. is collected and used as the aromatic compound in the sulfonation. Such a fraction is customarily obtained as a byproduct in the known acetylene oil quench process, cf. Ullmann's Encyclopedia of Industrial Chemistry, VCH Verlagsgesellschaft mbH, Weinheim, 1985, Volume 71, pages 107-112.

This aromatics fraction is a mixture of many aromatic substances whose structures and amounts can in practice not be determined in detail. The following arene compounds are the chief representatives of this aromatics fraction:

|  | % by weight of aromatics fraction |
|---|---|
| Naphthalene | 30-55 |
| 2-Methylnaphthalene | 5-15 |
| 1-Methylnaphthalene | 4-10 |
| Indene | 3-10 |
| Biphenyl | 1-5 |
| Methylindene | 1-5 |
| Acenaphthene | 1-4 |

The aromatics fraction also contains as identified constituents in amounts of from 0.1 to about 2% by weight the following arene compounds: fluorene, indane, methylstyrene, phenanthrene, methylindane, dimethylnaphthalene, ethylnaphthalene, xylenes, tetralin, styrene, methylethylbenzene, anthracene, fluoranthrene, pyrene, acetnaphthylene and toluene. The sulfonation is preferably performed on an aromatics fraction containing from 40 to 45% by weight of naphthalene.

The aromatic compounds are sulfonated in step (a) with oleum at 120°-160° C., preferably at 135°-145° C. Higher temperatures require shorter reaction times than lower temperatures. For example, the sulfonation takes from 1.6 to 2.6 hours at 145° C., while from 2.25 to 4 hours are required at 140° C. and from 3.25 to 6 hours at 135° C.

The aromatic compounds are sulfonated per part by weight with from 0.7 to 1.5 parts by weight of oleum, based on a fuming sulfuric acid having an $SO_3$ content of 65% by weight. The sulfonation of the aromatic compounds may of course also be effected with concentrated sulfuric acid or with a sulfuric acid which has an $SO_3$ content of for example from 10 to 60% by weight. The amount of oleum used in the sulfonation step (a) depends on the $SO_3$ content of the fuming sulfuric acid. If the above-specified temperature range is maintained during the sulfonation and the above-described amounts of oleum are used, then the naphthalene, or the naphthalene-containing mixture of aromatic compounds, will contain sulfonation products which contain $\alpha$- and $\beta$-naphthalenesulfonic acid in a ratio of from 20:1 to 1:8, preferably from 10:1 to 1:5.

The sulfonation itself and/or the subsequent condensation as per step (b) are performed in the presence of carboxylic acids which contain an aromatic group or a long-chain aliphatic radical or in the presence of salts or anhydrides thereof, aromatic carboxylic acids and derivatives thereof being preferred.

Suitable examples of these preferred compounds are naphthalenecarboxylic acid, naphthalic acid, terephthalic acid, isophthalic acid, benzoic acid, trimellitic acid, phenylacetic acid, phenoxyacetic acid, salicylic acid, p-hydroxybenzoic acid, diphenylacetic acid, m-hydroxybenzoic acid, benzenetetracarboxylic acid and anhydrides of acids, for example phthalic anhydride, trimellitic anhydride, benzene-1,2,4,5-tetracarboxylic dianhydride or naphthalic anhydride.

Suitable long-chain aliphatic carboxylic acids are in particular saturated or olefinically unsaturated, linear or branched aliphatic monocarboxylic acids of from 8 to 22, preferably from 8 to 18, carbon atoms of natural or synthetic origin, i.e. for example higher fatty acids such as caprylic acid, capric acid, lauric acid, myristic acid, palmitic acid, stearic acid, oleic acid, linoleic acid or linolenic acid or synthetically prepared carboxylic acids such as 2-ethylhexanoic acid, isononanoic acid and isotridecanoic acid.

It is also possible to use mixtures of anhydrides, mixtures of carboxylic acids, mixtures of salts of suitable carboxylic acids and also mixtures of carboxylic acids and anhydrides. Suitable salts of the stated carboxylic acids are the alkali metal, ammonium and alkaline earth metal salts, which are obtainable for example by neutralizing these carboxylic acids with sodium hydroxide, potassium hydroxide, lithium hydroxide, sodium carbonate, magnesium carbonate, calcium oxide, calcium hydroxide, ammonia or alkanolamines, such as ethanolamine, diethanolamine or triethanolamine.

Particular preference is given to using sodium benzoate, sodium phenylacetate, sodium salicylate, sodium 4-hydroxybenzoate, sodium terephthalate, sodium 2-hydroxy-3-naphthalenecarboxylate, naphthalene-1-carboxylic acid, phthalic anhydride and benzoic acid.

The aryl-containing or long-chain alkyl-containing carboxylic acids are used in amounts of from 5 to 50, preferably from 6 to 42, in particular from 10 to 30, % by weight, based on the aromatic compounds used in the sulfonation (a). The abovementioned carboxylic acids and their salts or anhydrides may be added before, during or after the sulfonation step (a) or else in the course of the condensation as per step (b). It is similarly possible to add these compounds to modify the arenesulfonic acid/formaldehyde condensation products for both the sulfonation step (a) and the condensation step (b).

The sulfonated product mixtures are then condensed with formaldehyde in a conventional manner. This may be done by starting directly from the sulfonation mixture, diluting it with water and condensing it by adding formaldehyde, for example within the temperature range from 90° to 105° C. The condensation may of course also be carried out under superatmospheric pressure at 105°-150° C. The condensation reaction requires about 4-12, preferably 7-9, hours. The amount of formaldehyde required in the condensation per part by weight of aromatic compound used in the sulfonation (a) is about 0.05-0.20, preferably from 0.07 to 0.17, part by weight of formaldehyde (calculated at 100% strength). The formaldehyde is preferably used in the condensation as a 10-50% strength by weight aqueous solution.

After the condensation has ended, the reaction mixture is neutralized. This may be done with sodium hydroxide, potassium hydroxide, calcium hydroxide, sodium carbonate or sodium bicarbonate. It is also possible to use an excess of the neutralizing agent and bring the pH back down to the desired value by adding customary mineral acids such as sulfuric acid or the abovementioned aromatic or long-chain aliphatic carboxylic acids. The pH of the aqueous solution which contains the condensate in solution is customarily adjusted to 6-11. However, it is also possible to isolate the condensation product from the solution in a solid form by spray drying.

The arenesulfonic acid/formaldehyde condensation products preparable in the presence of aryl-containing or long-chain alkyl-containing carboxylic acids are readily soluble in water and are suitable, as are the other dispersants according to the invention, for use as dispersants in dye formulations and in textile dyeing dyebaths. Dyes which are formulated in water with the use of dispersants are those which are insoluble or only sparingly soluble in water, for example vat dyes, disperse dyes and water-insoluble or only sparingly water-soluble fluorescent whitening agents. Disperse dyes are for example water-insoluble or only sparingly water-soluble azo dyes, dyes of the class of the quinophthalones and their water-insoluble derivatives, anthraquinone dyes and dyes of other classes which are sparingly soluble or insoluble in water and go on to synthetic fiber material such as linear polyesters from an aqueous bath. In dye formulations the dispersant according to the present invention is required in amounts of from 8 to 500, preferably from 25 to 400, parts by weight per 100 parts by weight of dye. If used as a dyeing assistant in dyebaths for dyeing textiles, the dispersants according to the present invention are conventionally employed in amounts of from 0.5 to 5 g/l, based on the dyebath. The dye formulations obtainable in this way have long shelf lives, permit satisfactory level package dyeings without dye deposits, and are highly degradable or at least eliminable.

Further preferred dispersants are those which are obtainable by subsequently mixing the aromatic or long-chain aliphatic carboxylic acids B or salts and anhydrides thereof into customary dispersants, in particular into compounds A. This mixing in takes place after the customary dispersants or the compounds A have been prepared.

It was to be expected that in mixtures of customary dispersants with readily bioeliminable or biodegradable products the bioeliminability or biodegradability would increase. However, the measured values surprisingly exceed the calculated values by from about 10 to about 30%. This shows that in these mixtures synergisms are at work in respect of bioeliminability and biodegradability which leave the dispersing properties virtually unchanged.

The ligninsulfonates used are in particular those sulfonates, especially the alkali metal salts, whose sulfo group content does not exceed 25% by weight. Particular preference is given to ligninsulfonates containing from 5 to 15% by weight of sulfo groups.

The arenesulfonic acid-formaldehyde condensates and sulfonates of phenol-formaldehyde condensates used are in particular those having a maximum sulfo group content of 40% by weight.

Suitable arenesulfonic acid-formaldehyde condensates are based for example on naphthalene or on the abovementioned mixtures of aromatic compounds which contain at least 10% by weight of naphthalene and which can be sulfonated to give arenesulfonic acid components. Particular preference is given to condensates which are based on the above-described aromatics mixtures obtainable by thermal cracking of a naphthenic residue oil and fractional distillation of the cracking products.

The naphthalenesulfonic acid components used here are in general isomer mixtures in which the ratio of the α- to the β-isomer is within the range from 20:1 to 1:8, in particular from 10:1 to 1:5.

As aromatic or long-chain aliphatic carboxylic acids B it is possible in principle to use the same compounds as mentioned above.

Particularly suitable carboxylic acids B here are for example naphthalenecarboxylic acids, hydroxynaphthalenecarboxylic acids, o-, m- and p-benzenedicarboxylic acid, o-, m- and p-hydroxybenzoic acid, benzoic acid, phenylacetic acid, diphenylacetic acid, benzenetricarboxylic acids and benzenetetracarboxylic acids, also oleic acid and isononanoic acid.

These compounds are mixed in either as the free acid and/or as the salt and/or as the anhydride. Preference is given to using salts which can be obtained by neutralization with sodium hydroxide or potassium hydroxide solution, with ammonia or with alkanolammonium compounds.

The dispersants of the present invention, in addition to customary dispersants or sulfo-containing compounds A and the aromatic carboxylic acids B, may further contain customary assistants C in an amount of up to about 5% by weight, for example other dispersants, surfactants, defoamers, hydrotropes, standardizing agents, complexing agents or biocides.

The dispersants of the present invention can further be used with good results in pigment preparations. Such pigment preparations can then be used for example for coloring carpets, paper materials, crop protection agents, building materials, detergents or paintbox colors.

The dispersants of the present invention are also highly suitable for use as tanning aids, i.e. aids used in the production of leathers and furs, for example as dispersants in the coloring of leathers and furs.

The dispersants of the present invention can also be used with great advantage in plastics production, for example as dispersants or emulsifiers in latex production.

The dispersants of the present invention can also be used to good effect in crop protection formulations. Examples thereof are the use as dispersants or emulsifiers in powder or liquid formulations of herbicides, fungicides or insecticides.

The bioeliminability or biodegradability was determined by the Zahn-Wellens test (R. Zahn, H. Wellens, Chem. Zeitung 90 (1974), 228; OECD 302 B corresponds to DIN 38412, Part 25). This test makes use of an activated sludge which contains a mixture of various microorganisms and mineral nutrients. An aqueous solution of this activated sludge is kept together with an aqueous solution of the test substance substantially in the dark at a constant temperature of about 22° C. for a set period (up to 28 days) while being aerated. The decrease in the concentration of the test substance is determined by determining the chemical oxygen demand (COD) or the dissolved organic carbon (DOC). Good biodegradability or bioeliminability requires a COD or DOC value of >70%; cf. U. Pagga, Umweltschutz-Umweltanalytik 4 (1984), 9.

The arylcarboxyl-containing arenesulfonic acid/formaldehyde condensation products to be used according to the present invention are in general more than 55% and in particular more than 70% degradable or at least eliminable, while commercial naphthalenesulfonic acid/formaldehyde condensates are only 30% eliminable under the same conditions and ligninsulfonates only about 33%.

EXAMPLES

In the Examples, the parts and percentages are by weight. The dispersants were prepared using, unless otherwise stated, aryl compounds obtained by fractional distillation of the cracking products of a naphthenic residue oil in accordance with EP-A-0 380 778. Specifically, the fraction passing over at 100°–120° C. under atmospheric pressure (1013 mbar) was used. The thermal cracking of the naphthenic residue oil was carried out at 1400°–1700° C.

Specifically the following substances were identified in the mixtures of aryl compounds obtained by fractional distillation of the cracking products:

| Compound | % |
| --- | --- |
| Naphthalene | 44.60 |
| 2-Methylnaphthalene | 10.00 |
| 1-Methylnaphthalene | 6.20 |
| Indene | 7.40 |
| Biphenyl | 2.20 |
| Methylindene | 1.95 |
| Acenaphthene | 1.70 |
| Fluorene | 1.30 |
| Indane | 1.22 |
| Phenanthrene | 1.10 |
| Methylindane | 1.10 |
| Dimethylnaphthalene | 1.13 |
| Ethylnaphthalene | 0.82 |
| p- and m-Xylene | 0.80 |
| Tetralin | 0.80 |
| Styrene | 0.60 |

The eliminability of the dispersant was determined by the Zahn-Wellens test as per German Standard Specification DIN 38412, Part 25.

Dispersant 1

128 parts of the mixture of the above-described aryl compounds and 29 parts of phthalic anhydride were introduced into a heatable reaction vessel, equipped with stirrer, and heated to 60° C. with stirring. Then 107 parts of oleum containing 65% of $SO_3$ were added over 4 hours while ensuring that the temperature did not rise above 70° C. After the oleum had been added, the reaction mixture was stirred at 60° C. for 4 hours and at 135° C. for 5 hours. It was then cooled back to 70° C., 150 parts of water were added, followed by 50 parts of 30% strength aqueous formaldehyde, and the mixture was then condensed by heating at 100° C. for 8 hours. Then 500 parts of water and 125 parts of 50% strength aqueous sodium hydroxide solution were added. The pH was found to be 11.2. The mixture was then stirred at 90° C. for one hour and admixed with 15 parts of 20% strength aqueous sulfuric acid to adjust to pH 8.4.

The solution had a solids content of 27.1%.

In the sulfonated product the ratio of $\alpha$- to $\beta$-naphthalenesulfonic acid was 2.3:1.

The condensation product was 72% eliminable.

Dispersant 2

The preparation of dispersant 1 was repeated, except that the 29 parts of phthalic anhydride were replaced by 52 parts of naphthalene-1-carboxylic acid. The aqueous solution of the dispersant had a pH of 8.1 and a solids content of 28.1%. The ratio of $\alpha$- to $\beta$-naphthalenesulfonic acid was 1.7:1. The bioeliminability/degradability of the spray-dried product was >70%.

Dispersant 3

The procedure used in the preparation of dispersant 1 was repeated, except that instead of the 29 parts of phthalic anhydride 25 parts of benzoic acid were added to the mixture of the above-described aryl compounds. The ratio of $\alpha$- to $\beta$-naphthalenesulfonic acids was 1.2:1. The aqueous solution of the dispersant had a solids content of 25.8%. The bioeliminability/degradability of the spray-dried product in the Zahn-Wellens test was 75%.

Dispersant 4

128 parts of pure (96–98%) naphthalene and 25 parts of benzoic acid were introduced into a vessel as described for dispersant 1 and heated to 90° C. with stirring. Then 107 parts of oleum containing 65% of $SO_3$ were added over 2 hours while ensuring that the temperature did not rise above 95° C. After the oleum had been added, the reaction mixture was heated to 140° C. and stirred at that temperature for 3.5 hours. It was then cooled back to 80° C., 150 parts of water were added, followed by 50 parts of 30% strength aqueous formaldehyde, and the mixture was condensed at 100° C. for 8 hours.

Then 500 parts of water and 131 parts of 50% strength aqueous sodium hydroxide solution were added. The mixture was stirred at 90° C. and pH 10.5 for one hour. Then 365 parts of water and 12 parts of 20% strength aqueous sulfuric acid were added to obtain a solution having a pH of 8.4 and a solids content of 20%. In the sulfonated product, the ratio of $\alpha$- to $\beta$-naphthalenesulfonic acid was 1:4.6.

The bioeliminability of the spray-dried product in the Zahn-Wellens test was 70%.

Dispersant 5

The procedure for dispersant 3 was repeated, except that the amount of oleum containing 65% of $SO_3$ used was increased from 107 parts to 115 parts.

The ratio of $\alpha$- to $\beta$-naphthalenesulfonic acid was 1:1.5. The aqueous solution of the dispersant had a solids content of 25.6%. The condensation product was >70% eliminable. Dispersant

Dispersant 6

The procedure used in the preparation of dispersant 1 was repeated, except that instead of the 29 parts of phthalic anhydride 56 parts of oleic acid were added to the mixture of the above-described aryl compounds. The ratio of $\alpha$- to $\beta$-naphthalenesulfonic acids was 2.01:1. The aqueous solution of the dispersant had a pH of 8.2 and a solids content of 28.3%. The spray-dried product had a bioeliminability/degradability of 86%.

Dispersants 7 to 24

Dispersants 7 to 24 were prepared by subsequently mixing sodium salts of aromatic carboxylic acids into dispersants of a comparatively low bioeliminability or biodegradability. The starting dispersants used for this purpose were as follows:

(I) the above-described mixture used for the preparation of dispersant 1 of aryl compounds obtained in the factional distillation o: the cracking products of a naphthenic residue oil;

(II) a commercial naphthalenesulfonic acid-formaldehyde condensate having a sulfo group content of 30%, prepared by condensation of naphthalenesulfonic acid to (α- to β-isomer ratio 1:4.5) with formaldehyde;

(III) commercial sodium ligninsulfonate having a sulfo group content of 7%;

(IV) commercial sodium ligninsulfonate having a sulfo group content of 14%;

(V) commercial sodium ligninsulfonate having a sulfo group content of 22%.

As sodium salts of aromatic carboxylic acids were used sodium benzoate, sodium 4-hydroxybenzoate, sodium phenylacetate, sodium salicylate and sodium terephthalate. For this purpose the sodium salicylate and the sodium terephthalate were each prepared by neutralization of the free acids with sodium hydroxide solution to pH 9.5 and subsequent evaporation.

The following table shows the measured bioeliminabilities/degradabilities $E_{bio}$ of the prepared mixtures.

| Example No. | Dispersant | $E_{bio}$ [%] |
|---|---|---|
| | Mixtures according to the present invention: | |
| 7 | 95% of I + 5% of sodium benzoate | 70 |
| 8 | 85% of I + 15% of sodium benzoate | 70 |
| 9 | 90% of I + 10% of sodium phenylacetate | 77 |
| 10 | 70% of I + 30% of sodium phenylacetate | 81 |
| 11 | 90% of I + 10% of sodium salicylate | 75 |
| 12 | 70% of I + 30% of sodium salicylate | 75 |
| 13 | 90% of II + 10% of sodium benzoate | 56 |
| 14 | 70% of II + 30% of sodium benzoate | 65 |
| 15 | 70% of II + 30% of sodium 4-hydroxybenzoate | 57 |
| 16 | 90% of II + 10% of sodium phenylacetate | 58 |
| 17 | 70% of II + 30% of sodium phenylacetate | 73 |
| 18 | 90% of III + 10% of sodium benzoate | 57 |
| 19 | 70% of III + 30% of sodium benzoate | 60 |
| 20 | 70% of III + 30% of sodium 4-hydroxybenzoate | 74 |
| 21 | 90% of III + 10% of sodium terephthalate | 68 |
| 22 | 70% of III + 30% of sodium terephthalate | 74 |
| 23 | 70% of IV + 30% of sodium benzoate | 59 |
| 24 | 70% of V + 30% of sodium benzoate | 63 |
| | For comparison: | |
| | 100% of I | 45 |
| | 100% of II | 30 |
| | 100% of III | 30 |
| | 100% of IV | 27 |
| | 100% of V | 14 |
| | 100% of sodium benzoate | 99 |
| | 100% of sodium phenylacetate | 99 |
| | 100% of sodium salicylate | 99 |
| | 100% of sodium 4-hydroxybenzoate | 99 |
| | 100% of sodium terephthalate | 99 |

The measurements were carried out in accordance with OECD guidelines 302 B (Zahn-Wellens test) at a sludge concentration of 1 g of dry matter/l and a test concentration of about 400 mg of COD/l.

Application examples

The state of fine division in the dye preparations was characterized by the centrifuge test of Richter and Vescia, Melliand Textilberichte 1965, 621–625 (No. 6).

The numerical values correspond to the % of dye which on centrifuging at 1000, 2000 and 4000 revolutions per minute sediments within 5 minutes (values 1–3) and which at the end still remains in dispersion (value 4). Dye preparations which give a small sedimentation value and high final value are particularly finely divided.

EXAMPLE 25

20 parts of the blue disperse dye of C.I. number 11345 (calculated dry) in the form of the aqueous press cake was pasted up with 18 parts of the dispersant 1, 10 parts of sorbitol in the form of a 70% strength aqueous solution, 5 parts of propylene glycol, 1 part of a commercial aqueous biocide (1,2-benzisothiazolin-3-one as a 9.5% strength solution in propylene glycol)

and water to 100 parts by weight by means of a high-speed stirrer and ground in a stirred ball mill with glass balls until very finely divided. The pH was 8.5. The centrifuge test gave the following values: 2/3/23/72.

The dye preparation was liquid and storable and very highly suitable for dyeing polyester fibers and fabrics by any of the dyeing processes widely used for this purpose. In particular, when dyeing polyester/cotton blend fabrics by the thermosol method the dye preparation showed a high cotton reserve. Dyed packages of textured polyester fiber were found to be free of dye deposits.

EXAMPLE 26

16 parts of the red disperse dye C.I. Disperse Red 167:1 (calculated dry) in the form of the water-moist press cake were pasted up with 16 parts of dispersant 2, 15 parts of glycerol, 1 part of the biocide mentioned in Example 25 and water to a total weight of 100 parts, adjusted to pH 7.5 and ground in a stirred ball mill until very finely divided. The centrifuge test gave the following values: 5/7/19/69.

The dye preparation had the properties described under Example 25.

EXAMPLE 27

40 parts of the red disperse dye C.I. Disperse Red 277 in the form of the water-moist press cake (calculated dry) were adjusted with 60 parts of dispersant 3 and water to a solids content of 40%, pasted up and sand-milled until very finely divided. The centrifuge test gave the following values: 4/5/12/79.

The dispersion was spray-dried at a gas inlet temperature of 120° C. and diluted to the final color strength with 100 parts of dispersant 3. The resulting dye powder showed the state of fine division obtained in the wet-grinding stage.

Stirred into water, it produced a stable dyeing liquor which did not give any dye deposits even under HT dyeing conditions and was very highly suitable not only for dyeing textured polyester fiber packages but also for thermosoling polyester/cotton blend fabrics. In particular, this preparation produced very little staining of cotton fibers. The disperse dye was very easy to wash off the cotton.

EXAMPLES 28 AND 29

25 parts of Fluorescent Brightener 199 in the form of a water-moist press cake were pasted up with the dispersants mentioned in the Table, 15 parts of glycerol, 15 parts of triethanolamine and water to 100 parts total and bead-milled until vary finely divided, as measured by the centrifuge test. The pH was 10.0-11.0 and stayed at that level during the grinding. The preparation obtained was liquid and stable. It was highly suitable for the fluorescent whitening of polyester fibers and fabrics by the HT and thermosol processes and did not give any unlevelness or dye deposits even on dyeing packages of textile polyester fiber.

| Example | Dispersant No. | Grinding time | Fine division centrifuge value |
|---|---|---|---|
| 28 | 4 | 16 h bead milling | 10, 15, 36, 39 |
| 29[1)] | 4 | 14 h bead milling | 13, 17, 35, 35 |

[1)]Instead of 15 parts of glycerol, 15 parts of a 2:1 mixture of glycerol/sorbitol were used.

EXAMPLE 30

40 parts of the dye of C.I. number 69825 in the form of the aqueous press cake were bead-milled with 40 parts of dispersant 2 and an amount of water required to adjust the dry content to 20-25% at pH 10-11 until very finely divided. The centrifuge value was 3/8/10/79. After the grinding medium had been sieved off, a further 18 parts of dispersant 2 and 1 part of di-2-ethylhexyl sulfosuccinate and 1 part of di-$C_{10}$-alkyldisulfonimide were stirred in, and the mixture was filtered at a dry content of about 25% through a 3 μm filter plug and then spray-dried at an air inlet temperature of 130° C.

The dye powder obtained was readily redispersible in water, had a long shelf life and was suitable for all conventional dyeing processes.

EXAMPLE 31

23 parts of the dye of C.I. number 59825 in the form of the aqueous press cake were pasted up with 7 parts of dispersant 3, 15 parts of a 70% strength aqueous sorbitol solution and 1 part of commercial biocide as described in Example 25 and water to 100% and bead-milled at pH 10-11 until very finely divided. The centrifuge value was 5/16/31/48.

The dye preparation obtained was liquid, had a long shelf life suitable for all widely used dyeing processes.

EXAMPLE 32

50 parts of textured polyester yarn on packages were dyed in 1000 parts of an aqueous liquor containing 2 parts of the yellow disperse dye of Colour Index No. 47023, 1 part of the dispersant from Example 4 and 1 part by weight of 30% strength acetic acid. The pH of the liquor was 4.5. The dyeing was carried out in a closed apparatus with liquor recirculation by pumping the liquor through the package in alternating directions. The liquor was heated from 60° to 130° C. in the course of minutes. It was maintained at 130° C. for 60 minutes, then cooled back to 90° C. and finally dropped. The textile material was then reduction cleared at 70° C. with a fresh liquor containing 0.5 g/l of caustic soda, 2 g/l of sodium dithionite and 0.5 g/l of a nonionic detergent (condensation product of 1 mol of oleylamine and 12 mol of ethylene oxide) for about 20 minutes and then rinsed once with hot and once with cold water. The result obtained was a level wash- and crock-fast yellow dyeing.

EXAMPLE 33

Example 32 was repeated, except that the dye used was 2 parts of the disperse dye of Colour Index No. 60756. The result obtained was a level, wash- and crockfast red dyeing.

EXAMPLE 34

22 parts of the blue disperse dye C.I. Disperse Blue 60 (calculated dry) in the form of the water-moist press cake were pasted up with
12 parts of the dispersant of Example 20,
10 parts of sorbitol in the form of a 70% strength aqueous solution,
1 part of a commercially available biocide (1,2-benzisothiazolin-3-one in the form of a 9.5% strength solution in propylene glycol) and
water to 100 parts of total weight by means of a high-speed stirrer and milled in a stirred ball mill with glass media to obtain a state of fine division. The pH was 8.7. Centrifuge test: 3/4/24/69.

The dye formulation obtained was thin-bodied and storable and was very highly suitable for dyeing yarns and fabrics made of polyester fibers by any conventional dyeing process. When packages of textured polyester fibers were dyed, completely level dyeings were obtained which were completely free of filtered-out dye deposits.

EXAMPLE 35

25 parts of the red disperse dye C.I. Disperse Red 91 (calculated dry) in the form of the water-moist press cake were pasted up with
11 parts of the dispersant of Example 22,
12 parts of sorbitol in the form of a 70% strength aqueous solution,
1 part of the biocide mentioned in Example 34 and water to 100 parts of total weight, adjusted to pH 8.5 and milled in a stirred ball mill until a satisfactory state of fine division was obtained. Centrifuge test: 7/9/21/63.

The dye formulation obtained has the properties described under Example 34.

Similar results were obtained with the dispersant of Example 19.

EXAMPLE 36

40 parts of the red disperse dye C.I. Disperse Red 167:1 (calculated dry), in the form of an aqueous press cake, were pasted up with
60 parts of the dispersant of Example 19 and water to a suspension having a solids content of about 40%, brought to pH 7.5 with sulfuric acid (20% strength) and milled in a stirred ball mill until a satisfactory state of fine division was obtained. Centrifuge test: 9/13/32/46.

The dispersion was dried in a spray dryer at a gas inlet temperature of 120° C. and reduced in a blender to the final color strength by addition of 25 parts of the dispersant of Example 23.

The dye powder obtained had the state of fine division achieved in the wet milling stage. Stirring into water produced a stable dyeing liquor which had the good dyeing properties described in Example 34.

EXAMPLE 37

40 parts of the violet vat dye C.I. Vat Red 91 in the form of the water-moist press cake were pasted up with 60 parts of the dispersant of Example 23 and water to give a suspension having a solids content of 38% and milled in a stirred ball mill until a satisfactory state of fine division was achieved. Centrifuge test: 2/4/7/87.

After drying in a spray dryer at a gas inlet temperature of 130° C., 20 parts of the abovementioned dispersant were added to adjust to the final color strength.

The dye powder thus obtained had the state of fine division achieved in the wet milling stage. It had a long shelf life, was very readily dispersible in dyeing liquors and was highly suitable for dyeing cotton fibers by any conventional dyeing process.

EXAMPLE 38

23 parts of the vat dye Vat Green 1 (C.I. 59825) in the form of the aqueous press cake were pasted up with 10 parts of the dispersant of Example 11, 15 parts of a 70% strength aqueous sorbitol solution, 1 part of a commercial biocide (1,2-benzisothiazolin-3-one in the form of a 9.5% strength solution in propylene glycol) and water to 100 parts of total weight and bead-milled at pH 10-11 until a satisfactory state of fine division had been achieved. The centrifuge value was 4/14/29/53.

The dye formulation obtained was thin-bodied, storable and suitable for any conventional dyeing process.

EXAMPLE 39

40 parts of the vat dye Vat Blue 6 (C.I. 69825) in the form of the aqueous press cake were milled with 60 parts of the dispersant of Example 11 and the amount of water required to set a dry matter content of from 20 to 25% in a stirred ball mill at pH 10 and 11 until a satisfactory state of fine division had been achieved.

The centrifuge value was 5/10/12/73.

After milling, the dry matter content was adjusted to about 25%, 1 part of di-2-ethylhexyl sulfosuccinate and 1 part of di-$C_{10}$-alkyldisulfonimide were added, and the suspension was filtered through 3 μm filter plugs as often is required until it was specklefree. This was followed by spray drying at an air inlet temperature of about 150° C.

The dye powder obtained was readily dispersible in water, storable and suitable for any conventional dyeing process.

EXAMPLE 40

The same result as in Example 39 above was obtained when the dispersant of Example 11 was replaced by the mixture of Example 12.

EXAMPLE 41

20 parts of the blue azo disperse dye C.I. 11345 (calculated dry) in the form of the water-moist press cake were pasted up with 18 parts of the dispersant of Example 6, 15 parts of sorbitol in the form of a 70% strength aqueous solution, 1 part of a commercially available biocide, and water to 100 parts of total weight by means of a high-speed stirrer and milled in a stirred ball mill with glass media until a satisfactory state of fine division had been achieved. The pH was 8.3. Centrifuge test: 3/3/18/76.

The dye formulation was thin-bodied and storable and was very highly suitable for dyeing polyester fibers and fabrics by any conventional dyeing process. The formulation was notable in particular for a high cotton reserve in the dyeing of polyester/cotton blend fabrics by the thermosol process. When packages of textured polyester fibers were dyed, there were no filtered-out dye deposits.

We claim:

1. A dispersant of increased bioeliminability or biodegradability for use in dye and pigment products, containing
    A) from 50 to 97% by weight of one or more arenesulfonic acid-formaldehyde condensates, one or more ligninsulfonates or a mixture thereof, and
    B) from 3 to 50% by weight of one or more aromatic or $C_8$- to $C_{22}$-aliphatic carboxylic acids, salts thereof or anhydrides thereof or a mixture thereof, the addition of component B taking place before, during or after the sulfonation step or the condensation step in the preparation of component A.

2. A dispersant as claimed in claim 1, obtainable by subsequently mixing the aromatic or long-chain aliphatic carboxylic acids B or salts and anhydrides thereof into the compounds A.

3. The dispersant of claim 1, wherein component B is present at 5 to 30% by weight.

4. A dispersant based on a condensate of an arenesulfonic acid and formaldehyde, obtainable by
    (a) sulfonating an aromatic compound to the arenesulfonic acid and
    (b) condensing the arenesulfonic acid with formaldehyde, the sulfonation (a) or the condensation (b) or both steps being effected in the presence of from 5 to 50% by weight, based on the aromatic compound used in the sulfonation (a), of an aryl-containing or $C_8$- to $C_{22}$-alkyl-containing carboxylic acid or a salt or anhydride thereof.

5. A dispersant as claimed in claim 4, wherein the condensate is obtainable by (a) sulfonating naphthalene or a mixture of aromatic compounds containing at least 10% by weight of naphthalene.

6. A dispersant as claimed in claim 4, wherein the condensate is obtainable by (a) sulfonating arene compounds which are preparable by the thermocracking of an naphthenic residue oil and which form the fraction which in the course of the fractional distillation of the cracking products passes over at 100°-120° C., and 1013 mbar.

* * * * *

UNITED STATES PATENT AND TRADEMARK OFFICE
CERTIFICATE OF CORRECTION

PATENT NO. : 5,186,846
DATED : February 16, 1993
INVENTOR(S) : Ralf Brueckmann et al.

It is certified that error appears in the above-identified patent and that said Letters Patent is hereby corrected as shown below:

On the title page, Item [75],

The seventh inventor's name is spelled incorrectly, should read as follows:  --Herbert Leiter--

Signed and Sealed this

Eighth Day of February, 1994

*Attest:*

BRUCE LEHMAN

*Attesting Officer*     *Commissioner of Patents and Trademarks*